United States Patent
Revell et al.

(10) Patent No.: US 10,401,175 B2
(45) Date of Patent: Sep. 3, 2019

(54) OPTICAL INERTIAL MEASUREMENT APPARATUS AND METHOD

(71) Applicant: BAE SYSTEMS plc, London (GB)

(72) Inventors: James Duncan Revell, Bristol (GB); Mark Robert Goodall, Bristol (GB); Gary Martin Cross, Bristol (GB)

(73) Assignee: BAE SYSTEMS PLC, London (GB)

( * ) Notice: Subject to any disclaimer, the term of this patent is extended or adjusted under 35 U.S.C. 154(b) by 160 days.

(21) Appl. No.: 15/520,580

(22) PCT Filed: Jan. 30, 2015

(86) PCT No.: PCT/GB2015/050244
§ 371 (c)(1),
(2) Date: Apr. 20, 2017

(87) PCT Pub. No.: WO2016/062996
PCT Pub. Date: Apr. 28, 2016

(65) Prior Publication Data
US 2017/0307380 A1    Oct. 26, 2017

(30) Foreign Application Priority Data
Oct. 20, 2014    (GB) .................................. 1418617.5

(51) Int. Cl.
*G06K 9/00*    (2006.01)
*G01C 21/16*    (2006.01)
*G06T 7/70*    (2017.01)

(52) U.S. Cl.
CPC .............. *G01C 21/165* (2013.01); *G06T 7/70* (2017.01); *G06T 2207/30244* (2013.01)

(58) Field of Classification Search
None
See application file for complete search history.

(56) References Cited

U.S. PATENT DOCUMENTS 9,142,019 B2 * 9/2015 Lee ...................... H04N 13/254
9,229,540 B2 * 1/2016 Mandella ............ G06F 3/03545
(Continued)

FOREIGN PATENT DOCUMENTS

WO    WO-2014128498 A2 *    8/2014    ............ G01S 17/87
WO    2016062996 A1    4/2016

OTHER PUBLICATIONS

A spherical Eye from multiple cameras, Patrick Baker et al., IEEE, 0-7695-1272,2001, pp. I-576-I-583 (Year: 2001).*
(Continued)

*Primary Examiner* — Jayesh A Patel
(74) *Attorney, Agent, or Firm* — Finch & Maloney PLLC

(57) ABSTRACT

An optical inertial measurement method for determining a 6DOF pose in respect of a moving platform, the method comprising providing, in respect of said moving platform, a camera unit (10) comprised of at least three monocular cameras (14, 16, 18) connected rigidly together and configured such that their fields of view do not overlap and cover motion of said platform in each of three principal, substantially orthogonal axes; receiving video outputs from each of said cameras; determining individual point correspondences from said video outputs, and estimating therefrom, for each camera, a transform that includes translation values representative of direction of translation in the x and y axes, rotation about the optical axis and a scale factor, each transform being expressed with respect to a local 3D coordinate system associated with a respective camera; and mapping said translation values in the x and y axes to a global 3D coordinate system, having its origin defined by a point between said cameras, and multiplying said translation values by a respective scale factor so as to determine a 6DOF pose in respect of said camera unit.
An optical inertial measurement system is also disclosed.

20 Claims, 1 Drawing Sheet

(56) References Cited

U.S. PATENT DOCUMENTS

Figure 1:
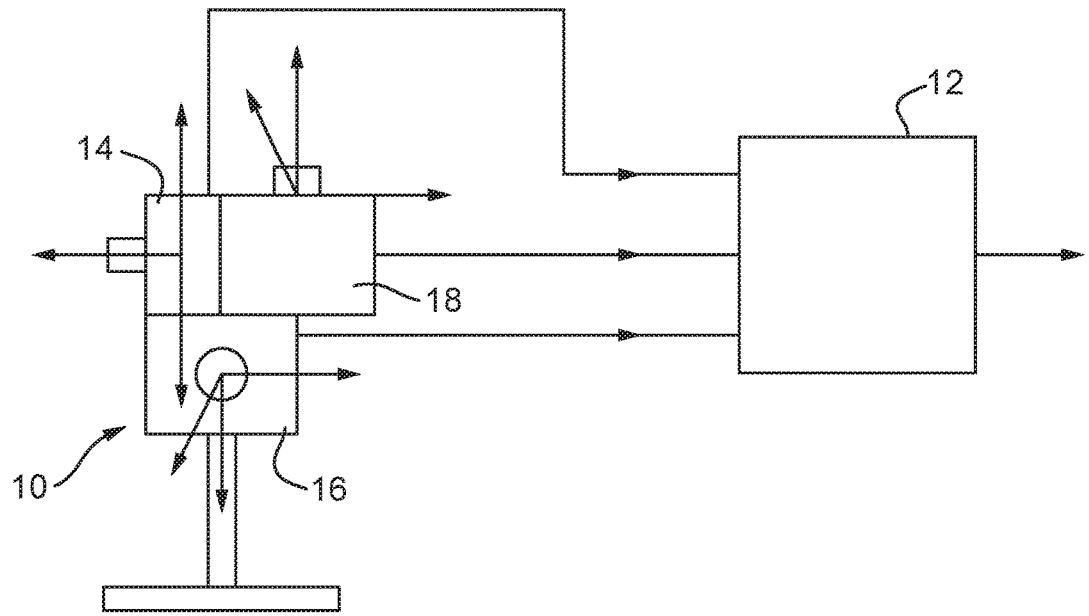

| | | | |
|---|---|---|---|
| 2009/0248304 A1 | 10/2009 | Roumeliotis et al. | |
| 2010/0134618 A1* | 6/2010 | Kim | G06F 3/011 348/140 |
| 2011/0285704 A1* | 11/2011 | Takeda | A63F 13/525 345/419 |
| 2014/0267234 A1* | 9/2014 | Hook | H04W 4/02 345/419 |
| 2017/0228878 A1* | 8/2017 | Goldman | G06T 7/344 |

OTHER PUBLICATIONS

A multi-Camera-DOF pose tracker, Sarah Tariq et al., IEEE, 0-7695-2191, 2004, pp. 1-2 (Year: 2004).*
Real-Time 6-DOF mocular Visual SLAM in a large scale enviornment, Hyon Lim et al., IEEE, 978-1-4799-3658-4, 2014, pp. 1532-1539 (Year: 2014).*
Robust 6DOF Motion estimation for Non-Overlapping, Multi-Camera Syatems, Brian Clipp et al., IEEE, Jan. 14 2009, pp. 1-8 (Year: 2009).*
Real-Time visual Odometry with Non-Overlapping fiels of view, Tim Kazik et al., IEEE, 978-1-4673-1228-8, 2012, pp. 1529-1536 (Year: 2012).*
High accuracy—Systems, Chayakorn Netramai et al., IEEE, 978-1-4577-1425-2, 2011, pp. 263-268 (Year: 2011).*
International Search Report and Written Opinion for Patent Application No. PCT/GB2015/050244, dated Jun. 2, 2015. 19 pages.
GB Intellectual Property Office Search Report under Section 17(5) for GB Patent Application No. 1418617.5 dated Mar. 26, 2015. 3 pages.
Baker, et al., "A Spherical Eye from Multiple Cameras (makes Better Models of the World)," Proceedings of the 2001 IEEE Computer Society Conference on Computer Vision and Pattern Recognition. vol. 1, 2001. pp. I-576-I-583.
Pless, R., "Using Many Cameras as One," Proceedings of the 2003 IEEE Computer Society Conference on computer Vision and Pattern Recognition. vol. 2, Jun. 2003. pp. 1-7.
Nister, et al., "Visual Odometry," Proceedings of the 2004 IEEE Computer Society Conference on Computer Vision and Pattern Recognition. vol. 1, Jun. 27-Jul. 2, 2004. 8 pages.
Kazik, et al., "Real-Time 6D Stereo Visual Odometry with Non-Overlapping Fields of View," Computer Vision and Pattern Recognition, 2012 IEEE Conference. Jun. 16, 2012. pp. 1529-1536.
Netramai, et al., "High Accuracy Visual Odometry Using Multi-Camera Systems," The 6th IEEE International Conference on Intelligent Data Acquisition and Advance Computing Systems: Technology and Applications. Sep. 15-17, 2011. pp. 263-268.
Netramai, C., "Using Mobile Multi-Camera Unit for Real-Time 3D Motion Estimation and Map Building of Indoor Environment," Chapters 1-7 and Appendices A and B. Feb. 25, 2011. Retrieved from the Internet: http://dokumentix.ub.uni-siegen.de/opus/volltexte/2011/495/pdf/Netramai.pdf. pp. 1-184.
2Clipp, et al., "Robust 6DOF Motion Estimation for Non-Overlapping, Multi-Camera Systems," Applications of Computer Vision. Jan. 7, 2008. pp. 1-8.
Zhang, et al., "Robust Monocular Visual Odometry for a Ground Vehicle in Undulating Terrain," The 8th International Conference on Field and Service Robots. Nov. 2012. pp. 1-15.
International Preliminary Report on Patentability for Patent Application No. PCT/GB2015/050244, dated May 4, 2017. 15 pages.

* cited by examiner

OPTICAL INERTIAL MEASUREMENT APPARATUS AND METHOD

This invention relates to an optical inertial measurement apparatus and method for estimating for six degrees of freedom (6DOF) pose.

There are many applications which require position and/or orientation of a moving platform to be determined and monitored, where the degree of freedom required is often application dependent. Degrees of freedom refers to the movement of a rigid body inside space. There are six degrees of freedom in total, divided into two different types: translations and rotations. Translational movement refers to the three degrees of freedom in which a body can translate, namely forward/back, left/right and up/down. Rotational movement, on the other hand, refers to the three degrees of freedom in which a body can rotate, namely pitch, yaw and roll. The above-mentioned 6DOF comprises both of these movement types, typically aligning with a left- or right-handed Cartesian coordinate system.

An Inertial Measurement Unit (IMU) is a device that measures velocity, orientation and gravitational forces, traditionally using a combination of sensors (accelerometers, gyroscopes and magnetometers).

Optical approaches for position and orientation estimation have been proposed, which employ cameras for recovering pose. Egomotion is defined as the 3D motion of a camera within an environment. The goal of estimating the egomotion of a camera is to determine the 3D motion of that camera using a sequence of images taken by the camera. The process of estimating a camera's motion within an environment involves the use of visual odometry techniques on a sequence of images captured by the moving camera. This may be done by feature detection to construct an optical flow from two image frames in a sequence, but other methods of extracting egomotion information from images exist.

The task of visual odometry is, therefore, to estimate motion of a camera and, by association, the platform to which it is attached, using a sequence of camera images.

A single view from a monocular camera, without additional constraints can only recover scale and not depth, also referred to as range or distance, prohibiting a 6DOF pose being estimated. However, it has been shown that it is possible to estimate a 6DOF pose using stereo cameras or multiple cameras with overlapping views.

Nistér, et al, "Visual Odometry", IEEE Computer Society Conference on Computer Vision and Pattern Recognition, volume 1, pages 652-659, 2004 proposes a technique which uses a calibrated stereo camera system with overlapping fields of view for visual navigation. The proposed algorithm employs a stereo camera system to recover 3D world points up to an unknown Euclidean transformation. In Frahm et al, "Pose Estimation for Multi-Camera Systems", DAGM, 2004, a 6DOF estimation technique using a multi-camera system is introduced, which assumes overlapping camera views to obtain the depth of the camera motion.

However, there are some disadvantages to using stereo or multiple overlapping camera views for calculating depth. Importantly, the estimated depth accuracy is dependent on very precise intrinsic and extrinsic camera calibration. The use of stereo cameras also reduces the useable field of view, because only features that lie in the intersection of the field of view of two or more cameras can be used.

For a single monocular camera, it is not possible to recover depth in the optical axis for arbitrary camera motion when using monocular imaging without using some additional information such as distance and attitude of the camera from the ground plane. Recent work, such as that described by B. Kitt et al, "Monocular visual odometry using a planar road model to solve scale ambiguity", Proc. European Conference on Mobile Robots (September 2011), shows that under the assumption that the imaged areas are flat and level, it is possible to use visual odometry with monocular imaging. However, this poses a significant constraint in that the proposed methods fail if the imaged areas are not guaranteed to be flat.

Zhang, Ji et al, "Robust Monocular Visual Odometry for a Ground Vehicle in Undulating Terrain", Carnegie Mellon University Research Showcase@CMU, November 2012 proposes a method in which visual odometry, coupled with wheel odometry, is used to recover pose in undulating settings using monocular vision. The proposed system uses a single monocular camera attached to the front of a wheeled vehicle. The proposed visual odometry algorithm requires the imaged areas to be locally flat in order to accurately estimate both translation and rotation and any ground inclination angle is found by tracking coplanar features on the ground. However, in cases where the imaged areas are not locally flat, the translation estimation using monocular vision is compromised, and the proposed method resorts to wheel odometry to resolve the translation estimation. Clearly, therefore, whilst provision is made in the proposed system to recover pose in 6DOF using a monocular camera, in practice, in order to achieve the required accuracy, additional components and significant additional computational overhead is required.

Aspects of the present invention are intended to address at least some of these issues.

In accordance with one aspect of the invention, there is provided an optical inertial measurement method for determining a 6DOF pose in respect of a moving platform, the method comprising:

providing, in respect of said moving platform, a camera unit comprised of at least three monocular cameras spatially fixed with respect to one another and configured such that their fields of view do not overlap and cover motion of said platform along each of three principal, substantially orthogonal axes;

receiving video outputs from each of said cameras;

determining individual point correspondences from said video outputs, and estimating, for each camera, a transform that includes translation values representative of direction of translation in the x and y axes, rotation about the optical axis and a scale factor, each transform being expressed with respect to a local 3D coordinate system associated with a respective camera; and mapping said translation values in the x and y axes to a global 3D coordinate system, having its origin defined by a point between said cameras, and multiplying said translation values by a respective scale factor so as to determine a 6DOF pose in respect of said camera unit.

In accordance with another aspect of the invention, there is provided optical inertial measurement apparatus for determining a 6DOF pose in respect of a moving platform, the apparatus comprising:

a camera unit comprised of at least three monocular cameras spatially fixed with respect to one another and configured such that their fields of view do not overlap and cover motion of said platform along each of three principal, substantially orthogonal axes; and a central processing unit for receiving video outputs from each of said cameras, and being configured to:

determine individual point correspondences from said video outputs, and estimate therefrom, for each camera, a transform that includes translation values representative of direction of translation in the x and y axes, rotation about the optical axis and a scale factor, each transform being expressed with respect to a local 3D coordinate system associated with a respective camera; and map said translation values in the x and y axes to a global 3D coordinate system, having its origin defined by a point between said cameras, and multiply said translation values by a respective scale factor so as to determine a 6DOF pose in respect of said camera unit.

Thus, a key feature of the present invention is the use of multiple monocular cameras in an orthogonal, non-overlapping configuration, corresponding to a left-handed or right-handed Cartesian coordinate system without the constraints associated with overlapping camera arrays, such as stereo. More specifically, depth is not required to be calculated, but is instead directly measured by the movement of the orthogonal cameras, thereby not only circumventing the limitation posed by a single view from a monocular camera, but also the constraint of two views from a stereo camera or multiple overlapping views from multiple cameras.

An additional advantage of the orthogonal camera arrangement is that there is no limit on depth resolution: a problem which arises in respect of two views from a stereo camera or multiple overlapping views from multiple cameras, as the baseline between cameras limits the range at which depth can be measured accurately.

The camera unit may comprise three monocular cameras spatially fixed with respect to one another by being rigidly connected together, wherein the optical axis of each of said three cameras is aligned with a respective one of said three principal orthogonal axes. Alternatively, the camera unit may comprise three or more monocular cameras rigidly connected together, wherein a first of said cameras has its optical axis aligned with a first one of said three principal orthogonal axes, and a plurality of further monocular cameras are configured to capture non-overlapping views from along the remaining two principal axes.

In one exemplary embodiment of the invention, the local 3D coordinate system for each camera may be a Cartesian coordinate system having its origin at the optical centre of the respective camera. In this case, the z-axis of said Cartesian coordinate system may coincide with the optical axis of the respective camera.

The global 3D coordinate system may have its origin at the centre point between said cameras.

Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of embodiments, even if the other features and embodiments make no mention of the particular feature. Thus, the invention extends to such specific combinations not already described.

Thus, embodiments of the present invention will now be described by way of example only and with reference to the accompanying drawings, in which:—

Figure 2:
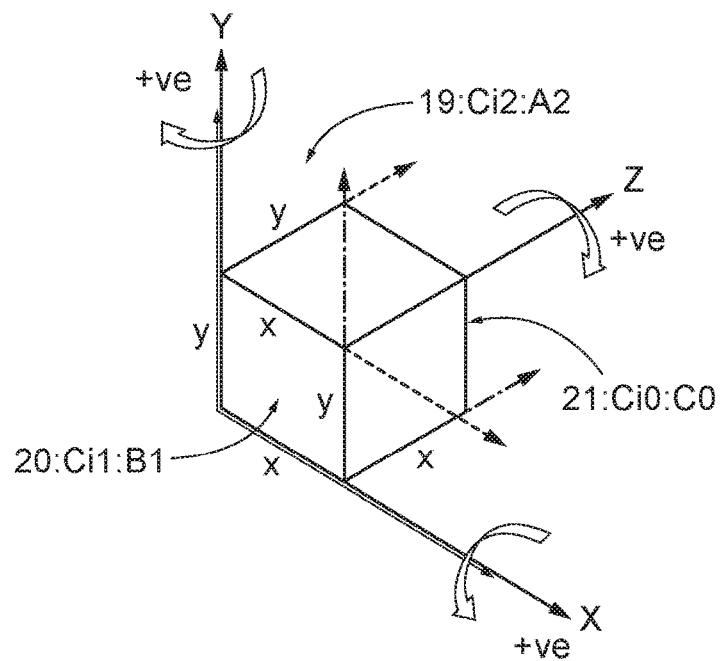

FIG. 1 is a schematic diagram illustrating the principal components of optical inertial measurement apparatus according to an exemplary embodiment of the present invention; and FIG. 2 is a schematic diagram illustrating a left-handed coordinate system employed in an optical inertial measurement method according to an exemplary embodiment of the present invention.

Referring to FIG. 1 of the drawings, apparatus according to an exemplary embodiment of the present invention comprises a camera unit 10 and a central processing unit 12. The camera unit, which may be mounted on a moving platform (not shown), comprises three monocular cameras 14, 16, 18 rigidly mounted together such that their principal optical axes are in an orthogonal, non-overlapping configuration.

Each camera has its own local 3D coordinate system $\{C_{1,2,3}\}$ with its origin at the respective camera optical centre and the z-axis coinciding with the camera principal axis. The x-y plane is parallel to the camera image sensor with the x-axis parallel to the horizontal direction of the image, as illustrated schematically in FIG. 2 of the drawings.

A global 3D coordinate system is also defined in respect of the three-camera system, with its origin at the centre point of the three cameras. It will be appreciated that, since each camera is fixed and the resultant system is a rigid body, physical measurements can be used to determine an absolute value for the centre point of the three cameras.

It can be seen from FIG. 2 that, in this exemplary embodiment of the invention, the global coordinate system is a left-handed Cartesian coordinate system to which the individual local coordinate systems of respective cameras are mapped. However, it will be appreciated that the local coordinate systems could equally be mapped to a right-handed Cartesian coordinate system, or any bespoke Cartesian coordinate system as required by the application and/or the computational infrastructure employed.

The egomotion of each individual camera is estimated or calculated based on its own video output running on its own CPU thread to the central processing unit 12. Any known approach can be used to calculate each individual camera's egomotion, and the present invention is not necessarily intended to be limited in this regard. An exemplary algorithm for estimating the egomotion of a single camera is provided in, for example, Frank Pagel, "Robust Monocular Egomotion Estimation Based on an IEKF", IEEE Computer Society 2009 Canadian Conference on Computer and Robot Vision, IEEE 2009, in which epipolar and trilinear constraints are optimised with respect to motion parameters using a robust Iterated Extended Kalman Filter (IEKF). Another exemplary method is presented by Scaramuzza, Davide et al, "Real-Time Monocular Visual Odometry for On-Road Vehicles with 1-Point RANSAC", Dagstuhl Seminar Proceedings, 2011, which uses feature extraction to recover the trajectory of a vehicle from the video input of a single camera.

It will be appreciated that these and other known methods of estimating egomotion require the application of assumptions by some form of motion model, thus requiring platform knowledge.

In contrast, aspects of the present invention circumvent the requirement for a motion model and, therefore, platform knowledge. Thus, the egomotion of each individual camera can be estimated using a simple algorithm which, for example, extracts feature points and determines correspondences for every frame-pair fed into a geometric hypothesis and test architecture to produce a statistically robust estimate of the transform between each frame-pair captured by motion of the respective camera Example algorithms for each of these steps can be found in Nistér, et al "Visual Odometry", IEEE Computer Society Conference on Computer Vision and Pattern Recognition, volume 1, pages 652-659, 2004. Each transform estimates a geometric model, using for example, an affine transformation, giving pure translation in the x- and y-axes, in-plane rotation and scale both about and in the optical (z) axis.

In order to recover the actual translation in the optical axis for each camera, the translations in the x- and y-axes are scaled using the scale as a multiplier from the other two orthogonal, rigidly configured cameras which have their x- and y-axes parallel to the optical axis of the camera being considered. This removes scale ambiguity from the motion parallax for each camera.

The resultant geometric models are then mapped to a global Cartesian coordinate system, in this case a left-handed Cartesian coordinate system, as illustrated schematically in FIG. 2 of the drawings, so as to recover motion on all three principal axes, and thus produce a full 6DOF pose.

It will be appreciated from the foregoing description that modifications and variations can be made to the described embodiments, without departing from the scope of the invention as claimed. For example, whilst the invention requires the use of multiple cameras which have non-overlapping fields of view that cover motion in each of the three axes, it is possible to provide the cameras in alternative configurations. In one exemplary alternative embodiment, a single camera may be provided which faces upward, and five cameras may be provided that face outward, in a substantially pentagonal configuration.

The invention claimed is:

1. An optical inertial measurement method for determining a 6DOF pose in respect of a moving platform, the method comprising:
receiving video outputs from each of at least three monocular cameras, said at least three cameras included in a camera unit and spatially fixed with respect to one another, such that their fields of view do not overlap and cover motion of said platform along each of three principal, substantially orthogonal axes;
determining individual point correspondences from said video outputs, and estimating therefrom, for each camera, a transform that includes translation values representative of direction of translation in x and y axes of a respective camera, rotation about an optical axis of the respective camera, and a scale factor of the respective camera, each transform being expressed with respect to a local 3D coordinate system associated with the respective camera, wherein the scale factor of the respective camera is based on the x and y axes of two of the other said at least three cameras that are parallel to the optical axis of the respective camera; and
mapping said translation values in the x and y axes to a global 3D coordinate system, having its origin defined by a point between said at least three cameras, and multiplying said translation values by the respective said scale factor so as to determine a 6DOF pose in respect of said camera unit.

2. The method according to claim 1, wherein said camera unit comprises three monocular cameras rigidly connected together, wherein the optical axis of each of said three cameras is aligned with a respective one of said three principal orthogonal axes.

3. The method according to claim 1, wherein a first of said at least three cameras has its optical axis aligned with a first one of said three principal orthogonal axes, and a plurality of further monocular cameras are configured to capture non-overlapping views from along the remaining two principal axes.

4. The method according to claim 1, wherein the local 3D coordinate system for each camera is a Cartesian coordinate system having its origin at an optical centre of the respective camera.

5. The method according to claim 4, wherein the z-axis of said Cartesian coordinate system coincides with the optical axis of the respective camera.

6. The method according to claim 1, wherein said global 3D coordinate system has its origin at a centre point between said at least three cameras.

7. An optical inertial measurement apparatus for determining a 6DOF pose in respect of a moving platform, the apparatus comprising:
a camera unit comprised of at least three monocular cameras connected rigidly together and configured such that their fields of view do not overlap and cover motion of said platform along each of three principal, substantially orthogonal axes; and
a central processing unit configured to receive video outputs from each of said at least three cameras, and further configured to determine individual point correspondences from said video outputs and estimate therefrom, for each camera, a transform that includes translation values representative of direction of translation in x and y axes of a respective camera, rotation about an optical axis of the respective camera, and a scale factor of the respective camera, each transform being expressed with respect to a local 3D coordinate system associated with the respective camera, wherein the scale factor of the respective camera is based on the x and y axes of two of the other said at least three cameras that are parallel to the optical axis of the respective camera, and map said translation values in the x and y axes to a global 3D coordinate system, having its origin defined by a point between said at least three cameras, and multiply said translation values by the respective said scale factor so as to determine a 6DOF pose in respect of said camera unit.

8. The apparatus according to claim 7, wherein said camera unit comprises three monocular cameras spatially fixed with respect to one another, wherein the optical axis of each of said three cameras is aligned with a respective one of said three principal orthogonal axes.

9. The apparatus according to claim 7, wherein a first of said at least three cameras has its optical axis aligned with a first one of said three principal orthogonal axes, and a plurality of further monocular cameras are configured to capture non-overlapping views from along the remaining two principal axes.

10. The apparatus according to claim 7, wherein the local 3D coordinate system for each camera is a Cartesian coordinate system having its origin at an optical centre of the respective camera.

11. The apparatus according to claim 10, wherein the z-axis of said Cartesian coordinate system coincides with the optical axis of the respective camera.

12. The apparatus according to claim 7, wherein said global 3D coordinate system has its origin at a centre point between said at least three cameras.

13. An optical inertial measurement apparatus, comprising:
a camera unit comprised of three monocular cameras spatially fixed with respect to one another, such that their fields of view do not overlap and cover motion of a moving platform along each of three principal, substantially orthogonal axes; and a central processing unit configured to receive video outputs from each of said cameras, and further configured to determine individual point correspondences from said video outputs and estimate therefrom, for each camera, a transform that includes translation values representative of direction of translation in x and y axes of a respective camera, rotation about an optical axis of the respective camera, and a scale factor of the respective camera, each transform being expressed with respect to a local 3D coordinate system associated with the respective camera, wherein the optical axis of each of said three cameras is aligned with a respective one of said three principal orthogonal axes, wherein the scale factor of the respective camera is based on the x and y axes of the other two of said three cameras that are parallel to the optical axis of the respective camera, and map said translation values in the x and y axes to a global 3D coordinate system, having its origin defined by a point between said cameras, and multiply said translation values by the respective said scale factor so as to determine a 6DOF pose in respect of said camera unit.

14. The apparatus according to claim 13, wherein a first of said cameras has its optical axis aligned with a first one of said three principal orthogonal axes, and a plurality of further monocular cameras are configured to capture non-overlapping views from along the remaining two principal axes.

15. The apparatus according to claim 14, wherein the local 3D coordinate system for each camera is a Cartesian coordinate system having its origin at an optical centre of the respective camera.

16. The apparatus according to claim 13, wherein the local 3D coordinate system for each camera is a Cartesian coordinate system having its origin at an optical centre of the respective camera.

17. The apparatus according to claim 16, wherein said global 3D coordinate system has its origin at a centre point between said cameras.

18. The apparatus according to claim 16, wherein the z-axis of said Cartesian coordinate system coincides with the optical axis of the respective camera.

19. The apparatus according to claim 18, wherein said global 3D coordinate system has its origin at a centre point between said cameras.

20. The apparatus according to claim 13, wherein said global 3D coordinate system has its origin at a centre point between said cameras.

* * * * *